March 13, 1962 A. F. VINAL 3,025,334
SEPARATOR-ELECTROLYTE MEMBER
Filed Oct. 8, 1958

INVENTOR.
ALBERT F. VINAL
BY John F. Hohmann
ATTORNEY.

3,025,334
SEPARATOR-ELECTROLYTE MEMBER
Albert F. Vinal, Shaker Heights, Ohio, assignor to Union Carbide Corporation, a corporation of New York
Filed Oct. 8, 1958, Ser. No. 766,004
5 Claims. (Cl. 136—86)

This invention relates to novel bonded separator-electrolyte members for gas-activated batteries.

In recently developed gas-activated batteries not to be confused with gas-depolarized batteries, there is provided a separator-electrolyte member consisting of a layer or mass of particles of hydrated inorganic salts which form electrolyte when reacted or coordinated with the activating gas.

It has been proposed to prepare such separators by immersing bibulous material in a saturated solution of the hydrated salt followed by drying under suitable conditions. Separators so prepared, however, do not have satisfactory gas penetration and activation properties for certain applications.

Another technique has been to cast a separator layer under vacuum from a slurry of salt particles in their saturated mother liquor with which has been mixed a small amount of filamentary material such as glass fibers. Undesirably, the cast matrix thus formed does not give the required rapidity of gas penetration, nor uniform activation, unless supplementary channels are cut in it. However, the cutting of multiple gas channels in separators which are already quite fragile results in their disintegration under operations of handling for cell assembly.

The main object of the invention, therefore, is to provide a method for making separator-electrolyte members for gas-activated batteries which permits forming separators to any desired shape together with the incorporation therein of multiple gas admittance channels of whatever desired configuration, thereby resulting in improved manufacturability, handling and performance.

Figure 1:
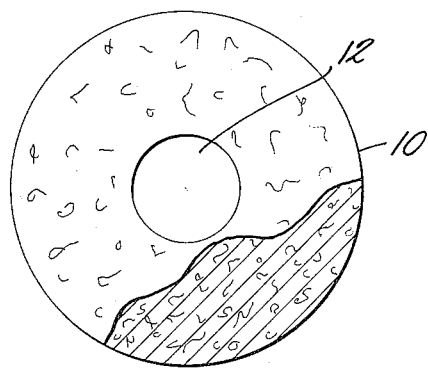
Figures 2, 3:
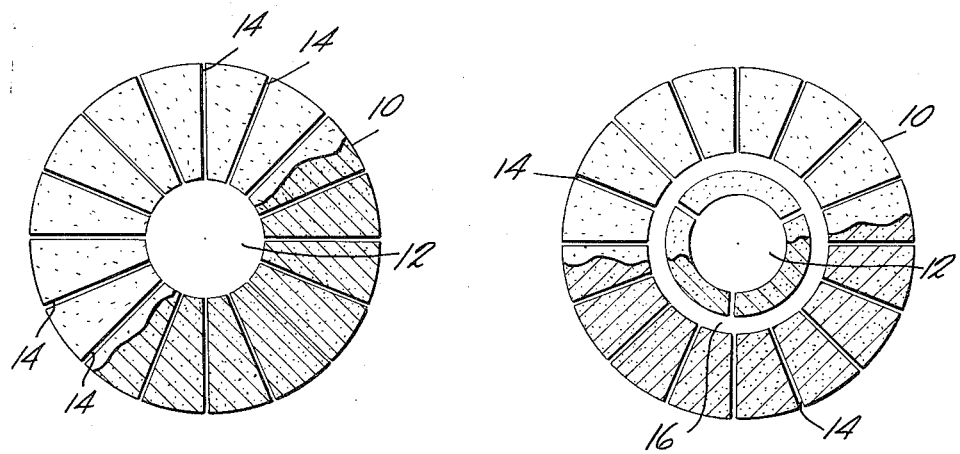

In the drawing, FIGURES 1, 2 and 3 are top plan views of various embodiments of the invention. The invention comprises the making of a paste consisting of the particles or crystals of the separator-forming material blended with a suitable bonding material dissolved in a suitable solvent, and the coating of such paste directly upon one of the cell electrode members. Coating may be done by any convenient method such as augering, extruding, roll-coating, etc., and desired gas channels can simultaneously or subsequently be made by customary methods such as by the use of blanking dies, die-cutting, scribing, coining, etc. After drying, the molded separators may be readily handled and stored for subsequent assembly into cells and batteries.

The selection of the bonding material and its solvent are dependent upon the chemical nature of both the separator material and the end products formed between the separator material and the activating gas. Stability of the bonding medium is required up to the point of gas activation. Thereafter, it must either remain stable or not form undesirable deterioration products. For example, in a system utilizing the octahydrate of barium or strontium hydroxide as a separator material, the environment, prior to gas activation, is highly alkaline, particularly if traces of moisture are present. After activation, if boron trifluoride gas is employed as the activating gas, the environment is highly acidic. This latter state exists when this gas is used with any starting separator material. The choice of a solvent to disperse the bonding medium throughout the mass of separator particles, and which is subsequently evaporated after molding, requires that the solvent be non-reactive toward the particular separator material used with it so as not to impair the electrolyte-forming capabilities of the separator material when subseqently activated by the gas.

In the development of this invention, a variety of organic solvents was investigated for their compatability with, and effects upon, hydrated inorganic salts, particularly strontium hydroxide octahydrate, which were used in a boron trifluoride gas-activated battery. Solvents having a high degree of water solubility or miscibility, such as acetone or alcohol, were found to have a rapid dehydrating action upon highly hydrated separator salts whose water of hydration it is necessary to fully preserve. The volume of solvent and time of exposure in contact with the separator salt was found with certain solvents, such as ethyl acetate, isopropyl acetate, and methyl ethyl ketone, to exert a deteriorative effect upon the water of hydration. Chlorinated solvents, such as ethylene dichloride and carbon tetrachloride, and aromatic hydrocarbon solvents, such as toluene, xylene, etc., were found to be inert with respect to separator salts such as barium and strontium hydroxide octahydrates. They are likewise inert as regards reactivity with boron trifluoride gas.

A variety of bonding materials in the classes of resins, waxes, and gums was investigated both as regards their adhesive properties when used in small amounts and more particularly as regards their behavior with boron trifluoride gas. Bonding materials found to be most suitable in a battery activated with boron trifluoride without charring and excessive viscosity build-up in the acid electrolyte formed from the separator salt are halogenated resins such as chlorinated biphenyl, chlorinated polyphenyls, and the condensation products of chlorinated hydrocarbons. Other suitable inert bonding materials of wax-like character are halogenated naphthalenes and the higher molecular weight polyethylene glycols.

The amount of solvent is not critical, but obviously is kept to such a volume in proportion to the amount of salt that the mixture is a plastic paste of suitable consistency depending upon the mechanical method for applying it. Additional solvent can be added if necessary to replace evaporation losses during handling and, for example, the cake after molding can be sprayed with solvent where it may be advantageous to improve cutting of gas channels.

The foregoing percentages of separator-salt and resin are not limiting since the amount of resin can be varied widely. The proportion of resin chosen will depend on the nature of the crystal form of the salt, and more particularly on its particle size. In some case, as little as 1 or 2 percent of resin may suffice to give a satisfactory bond. A suitable range is from 1 to 10 weight percent of resin to finished separator, however, a preferred range is 2.5 to 5 weight percent.

As an example of the practice of the invention a mixture was formed from about 90 percent by weight of strontium hydroxide octahydrate crystals and about 10 percent of chlorinated polyphenyl resin. The resin was first dissolved in toluene and then thoroughly blended with the salt crystals. The resulting plastic mixture was applied to one side of an anode. Gas channels were formed in the thus-provided coating by molding or by cutting gas access channels in the resin-salt cake. The formed supported electrolyte member then was dried to evaporate the solvent therefrom, and inserted in a gas-activated battery.

The performance of gas-activated batteries equipped with the separator-electrolyte member of the invention is as follows:

| Separator | Current density (milliamps/sq.in.) | O.C. voltage | Time to 1.4 V cutoff, minutes |
|---|---|---|---|
| 1 | 20 | 1.96 | 27 |
| 2 | 20 | 2.10 | 37 |

The electrolyte-forming materials used in the separator-electrolyte member of the invention include hydrated salts of the alkali metals and of the alkaline earth metals, which are capable of reacting with activating gasses such as chlorine $BF_3$ and the like to give water and an electrolyte.

As above-stated, the article of the present invention may assume various geometric shapes depending upon intended uses. Thus on FIGURE 1 is shown a circular separator 10 having a central opening 12 for a gas container. In this embodiment the activating gas passes through the separator and eventually reaches the electrolyte-forming members of the cell. Obviously the time required for such passage is greater in the case of this embodiment than it is with separators provided with channels. This embodiment, however, is self-supporting.

In FIGURE 2 appears another variant of the invention in which the separator-electrolyte member 10 is provided with a plurality of radial gas channels 12 extending from the gas container opening 14 to the circumference of the article.

On FIGURE 3 is shown a further modification of the present article wherein additional free space 16 is provided in the interior thereof.

What is claimed is:

1. A method of making a separator-electrolyte member for gas-activated cells comprising mixing a hydrated salt of a metal selected from the group consisting of the alkali metals and the alkaline earth metals with a bonding agent selected from the group consisting of chlorinated biphenyl resins, chlorinated polyphenyl resins and higher molecular weight polyethylene glycols, together wtih a sufficient amount of a solvent inert to said hydrated salt to give the resulting mixture a plastic consistency, applying a coating of said mixture to a cell electrode, forming gas channels in said coating, and allowing the coating to dry.

2. A bonded separator-electrolyte member for gas-activated cells comprising particles of a hydrated salt of a metal selected from the group consisting of the alkali metals and the alkaline earth metals integrally united by means of a bonding agent selected from the group consisting of chlorinated diphenyl resins, chlorinated polyphenyl resins and higher molecular weight polyethylene glycols, said bonding agent constituting a substantially continuous matrix for said salt particles, and being present throughout said electrolyte member in an amount ranging from 1 to 10 percent by weight thereof.

3. The device of claim 2 wherein said bonding agent is present in an amount ranging from 2.5 to 5 percent by weight.

4. The device of claim 2 additionally characterized by the presence of a plurality of gas channels.

5. A shaped separator-electrolyte member for gas-activated cells comprising about 90 percent by weight of strontium hydroxide octohydrate and about 10 percent of chlorinated polyphenyl resins.

References Cited in the file of this patent

UNITED STATES PATENTS

| | | |
|---|---|---|
| 856,162 | Kitsee | June 4, 1907 |
| 1,863,791 | Heise | June 21, 1932 |
| 2,569,491 | Otto | Oct. 2, 1951 |
| 2,572,296 | Zimmerman et al. | Oct. 23, 1951 |
| 2,597,116 | Marsal | May 20, 1952 |
| 2,615,931 | Hatfield | Oct. 28, 1952 |
| 2,762,858 | Wood | Sept. 11, 1956 |

UNITED STATES PATENT OFFICE
CERTIFICATE OF CORRECTION

Patent No. 3,025,334                                           March 13, 1962

Albert F. Vinal

It is hereby certified that error appears in the above numbered patent requiring correction and that the said Letters Patent should read as corrected below.

Column 3, line 19, for "12" read -- 14 --; line 20, for "14" read -- 12 --.

Signed and sealed this 24th day of July 1962.

(SEAL)
Attest:

ERNEST W. SWIDER                                    DAVID L. LADD
Attesting Officer                                       Commissioner of Patents